(12) United States Patent
Dragone

(10) Patent No.: US 6,782,163 B2
(45) Date of Patent: Aug. 24, 2004

(54) WAVEGUIDE GRATING ARRANGEMENT USING A SEGMENTED REFLECTOR

(75) Inventor: Corrado P. Dragone, Little Silver, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 349 days.

(21) Appl. No.: 10/055,587

(22) Filed: Jan. 22, 2002

(65) Prior Publication Data

US 2003/0138205 A1 Jul. 24, 2003

(51) Int. Cl.[7] .............................. G02B 6/34; G02B 6/30
(52) U.S. Cl. ........................ 385/37; 385/14; 385/129; 385/130; 385/132; 385/24; 398/49; 398/84; 398/87
(58) Field of Search .............................. 385/37, 14, 24, 385/129, 130, 131, 132; 398/49, 84, 87

(56) References Cited

U.S. PATENT DOCUMENTS

| | | | | |
|---|---|---|---|---|
| 5,987,050 A | * | 11/1999 | Doerr et al. ................. | 372/108 |
| 6,049,640 A | * | 4/2000 | Doerr ........................... | 385/15 |
| 6,240,118 B1 | * | 5/2001 | Doerr et al. .................. | 372/64 |
| 6,339,664 B1 | * | 1/2002 | Farjady et al. ................ | 385/37 |
| 6,574,396 B1 | * | 6/2003 | Dragone ....................... | 385/37 |
| 6,591,034 B1 | * | 7/2003 | Albrecht et al. ............... | 385/24 |
| 2002/0061168 A1 | * | 5/2002 | Farjady et al. ................ | 385/37 |
| 2003/0138205 A1 | * | 7/2003 | Dragone ....................... | 385/37 |

* cited by examiner

Primary Examiner—Brian M. Healy

(57) ABSTRACT

An optical imaging arrangement includes a wavelength router having (1) N waveguides connected to different locations of the input curved boundary of the router, (2) a grating that forms multiple paths through the router and which transforms a particular wavelength applied to one of the N waveguides into N interleaved sets of equally spaced output images corresponding to the different orders of the grating (3) an output curve illuminated by the various images and (4) N interleaved sets of reflective elements placed along the output curve with properly chosen periodicity, such that all significant orders of each set of images are reflected back through the arrangement, so as to effectively produce a single input reflection in only one of the N waveguides of the arrangement, and the particular waveguide is determined by the phase shifts produced by the sets of reflective elements.

17 Claims, 15 Drawing Sheets

WAVEGUIDE GRATING ARRANGEMENT USING A SEGMENTED REFLECTOR

TECHNICAL FIELD OF THE INVENTION

This invention relates to wavelength-division multiplexing in optical systems, and more particularly to a reflective apparatus for combining and/or separating wavelength channels.

BACKGROUND OF THE INVENTION

An important function that must be provided in high quality optical networks is that of wavelength multiplexing and demultiplexing a plurality of signals of different wavelengths. In particular, an important device for performing this function is a channel adding/dropping filter of the type realized in [1–3] This device is be referred to herein as a wavelength interchanger, or simply interchanger. It is essentially characterized by a set of nonoverlapping wavelength passbands. In each passband the interchanger essentially behaves as an ordinary a 2×2 switch. Thus the switch is characterized in each passband by two states, corresponding to the two permutations commonly referred to as cross and bar states. Moreover, the state in each passband can be chosen independently of those in the other passbands. Thus, the switch must include several controls, namely one for each passband. The interleaver must have low loss, preferably less than 3 dB, and it must be approximately characterized by rectangular transfer functions.

A technique that is often used for combining and separating signals of various channels in wavelength-division multiplexing is the wavelength router. A rectangular transfer function can be realized by concatenating two such routers, but such an arrangement is difficult to realize on a single wafer using conventional techniques for two reasons. The first reason is that the loss of a conventional router typically exceeds 3 dB, which would result in two concatenated routers having a total loss of more than 6 dB. Another reason is that the two-routers arrangement is difficult to realize on a planar wafer surface because of its size.

Thus there is a continuing need for a low loss interchanger having rectangular wavelength transfer functions.

SUMMARY OF THE INVENTION

In one embodiment of my new invention, a low loss wavelength interchanger is implemented using a waveguide grating router combined with (1) an input arrangement of N equally spaced waveguides that are connected to the router at equally spaced locations displaced by d on the input curve of the router and (2) an output arrangement of reflective elements causing each reflected signal to pass twice through the router. In this arrangement the waveguide grating router differs from a conventional router, in that suitable phase shifts $\phi$ are included in the grating elements, so as to cause each output image to split into N images of essentially identical intensities. Therefore, by applying to one of the N waveguides a particular wavelength, the router produces on the output image curve N interleaved sets of output images, wherein each significant order of the grating produces a particular image in each set, and N such images, respectively produced in the N sets by a particular order, have identical intensities. Accordingly, the output reflector arrangement includes N interleaved sets of reflective elements, such that each set reflects a particular set of images, and it applies to them the appropriate phase shifts $\alpha$, so as to cause the signal power to be only transferred to one particular waveguide. In one embodiment of this invention, each reflective element is realized using a multimoding imaging waveguide combined with a reflective termination. By using N=4 waveguides one can realize by this technique a 2×2 arrangement in which two of the N=4 waveguides are used as input waveguides, and, the other two, are used as output waveguides. Each pair of adjacent reflective elements is adapted with suitable heaters to produce a variable phase shift between the reflection coefficients of the two elements. One thus realizes a 2×2 arrangement in which the reflected input signals, after passing twice through the router, are recombined by the 2×2 arrangement, thus producing a reflected signal from either input port to either output port of the 2×2 arrangement, the output port being controlled by the phase shifts applied to the reflectors. One thus realizes a 2×2 switch arrangement in which each of the input signals can be switched to either of the output ports under control of the phase shifts applied to the reflectors.

More specifically, my invention can be realized as a waveguide grating router comprising a grating having an input curve and an output image curve, the input curve having N, N>2, equally spaced waveguides connected thereto, the output curve having reflective elements placed thereon, the waveguide grating router characterized by the grating having a plurality of elements forming multiple paths through the router so as to transform a particular input wavelength applied to one of the N waveguides into N components producing N interleaved sets of images, wherein each set of images consists of different orders of the grating router and said each set is produced by one of the N components and the output curve including N interleaved sets of reflective elements that have predefined phase shifts between the sets and are arranged so that all significant orders of each image set are reflected back through the router so as to efficiently transfer said particular input wavelength back to a selected one of the N waveguides, and wherein the selected waveguide is determined by preset phase shifts produced by the sets of reflective elements.

According to an operating method of my invention, for a waveguide grating router comprising a grating having an input curve and an output image curve, the input curve having N, N>2, equally spaced waveguides connected thereto, the output curve having a plurality of spaced reflectors arranged thereon, the method includes the steps of forming multiple paths through the router so as to transform a particular input wavelength applied to one of the N waveguides into N interleaved sets of equally spaced images on the output curve corresponding to different orders of the grating router;

reflecting back through the router, with predefined phase shifts from the N interleaved sets of reflective elements on the output curve, all significant orders of each image set so as to produce a single reflection of said particular input wavelength back to a selected one of the N waveguides, and selecting one of the N waveguides using preset phase shifts produced by the sets of reflective elements.

BRIEF DESCRIPTION OF THE DRAWINGS

In the drawings.

In the following description, identical element designations in different figures represent identical elements. Additionally in the element designations, the first digit refers to the figure in which that element is first located (e.g., 121 is first located in FIG. 1).

DETAILED DESCRIPTION
A. Router Description

Figure 1:
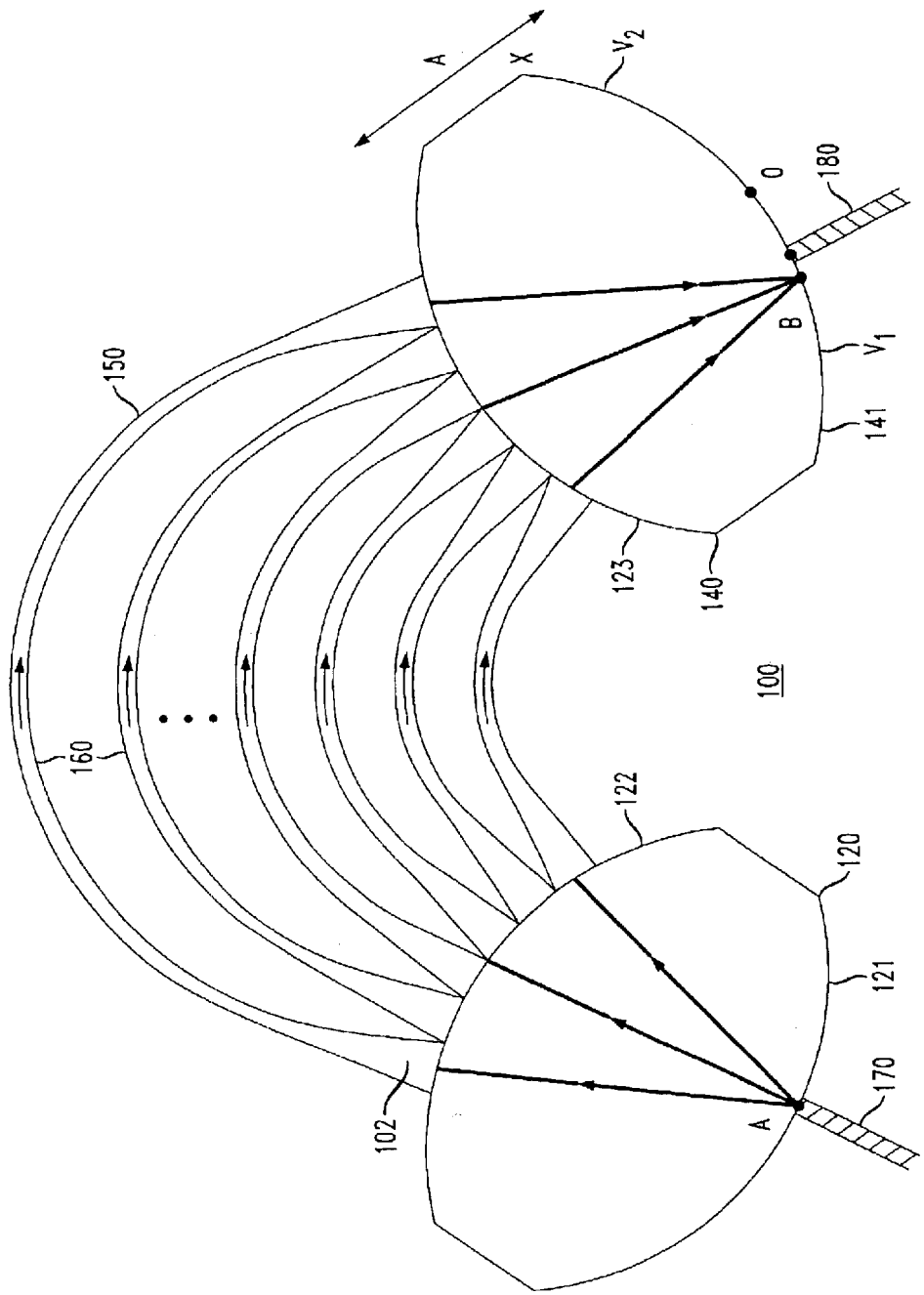
FIG. 1 illustrates the basic prior art form of optical wavelength router or grating.

FIG. 1 shows the basic structure of a prior art imaging arrangement 100 of the form used in the invention. Note the imaging arrangement is also referred to herein as a router. The imaging arrangement 100 is described in U. S. Pat. No. 6,023,544, issued on Feb. 8, 2000, which is incorporated by reference herein. The imaging arrangement 100 includes an input section 120 and an output section 140 spaced apart and interconnected by a grating 150 including an appropriate plurality of optical waveguide arms 160. The input and output sections typically are each free-space slabs, such as star couplers, that have the property that wave energy applied by an input waveguide 170 acting as a point source A forms a plurality of output images, of which three are shown as $B_{i-1}$, $B_i$, and $B_{i+1}$ in FIG. 2. The output image $B_i$ is the principal or central image since it is the image, which is closest to the center O of the central zone $\Omega_C$. The central zone $\Omega_C$ has the same width as the imaging spacing $\Omega$. The optical waveguide arms 160 typically are thin narrow layers of silica supported on a planar silicon wafer, as known in the art.

In a conventional imaging arrangement or router, the input and output ports are connected to the input and output sections 120 and 140 along portions of two circles that are typically referred to as the input 121 and output 141 circles. Here I simply refer to them as the input and output curves. For simplicity, FIG. 100 shows only one input 170 and one output 180 port.

The result is a router 100, which produces a wavelength dependent output image of each input signal. The location of each output image is determined by its wavelength $\lambda$ and therefore, signals of different wavelengths from a particular input port give rise to separate images that can be received by different output ports. Typically optical fibers are used for applying input signals to the input ports and for extracting output signals from the output ports. In practice, several output ports are needed, if the router is to send signals to several different destinations. Similarly, several input ports are needed, in order to receive signals from several different inputs. In wavelength division optical networks, the different wavelengths would represent different communication channels.

In FIG. 1, the input signal A radiated from the input waveguide 170 at a particular wavelength is radiated from the waveguide location towards the receiving apertures of the arms 160 forming the grating 150. As discussed earlier, there would be an appropriate number of arms in the grating 150. Each arm receives a component of the input signal. The signal is therefore split into many components, each traveling along a particular arm. Each arm applies to its component an appropriate phase shift, proportional to the optical path length of the arm. In a conventional router, successive arms are characterized to a good approximation by a constant path length difference. Then, one finds that the various signal components of a signal from an input port, radiated by the arms towards the output curve, all add in phase at certain locations on the output curve 141 shown in FIG. 2. As a result, several images $B_{i-1}$, $B_i$, $B_{i+1}$ of the input signal are produced on the output curve 141. These images represent different orders of the grating. They are equally spaced, and they have different intensities. Their spacing $\Omega$ is determined by the spacing a of the arms radiating apertures, $$\Omega = \frac{R\lambda}{a}$$

where R is the distance of the radiating apertures from the arms' focal point O and $\lambda/a$ is the angular spacing corresponding to $\Omega$. The spacing $\Omega$ is a function of the wavelength. However this dependence can be typically ignored, provided that $\lambda$ is close to a particular design wavelength $\lambda_0$, in which case $\Omega$ can be considered to be approximately equal to the value $\Omega_0$ at this particular wavelength $\lambda_0$. In the following I ignore for simplicity the above wavelength dependence. On the other hand, the phase shifts produced by the various arms typically have strong wavelength dependence. By varying the wavelength, the location of the output images $B_{i-1}$, $B_i$, $B_{i+1}$ vary along the output curve 141. Of greatest importance in a conventional router is the central image of highest intensity. This is the image closest to the central point O corresponding to the focal point of the arms. This image is produced inside the central zone $\Omega_C$, which is an interval of width $\Omega$ centered at O. The remaining images (of different orders) are produced in adjacent zones, of the same width. They typically have appreciably smaller intensity in all cases except when they are close to the boundaries of the central zone.

Figure 2:
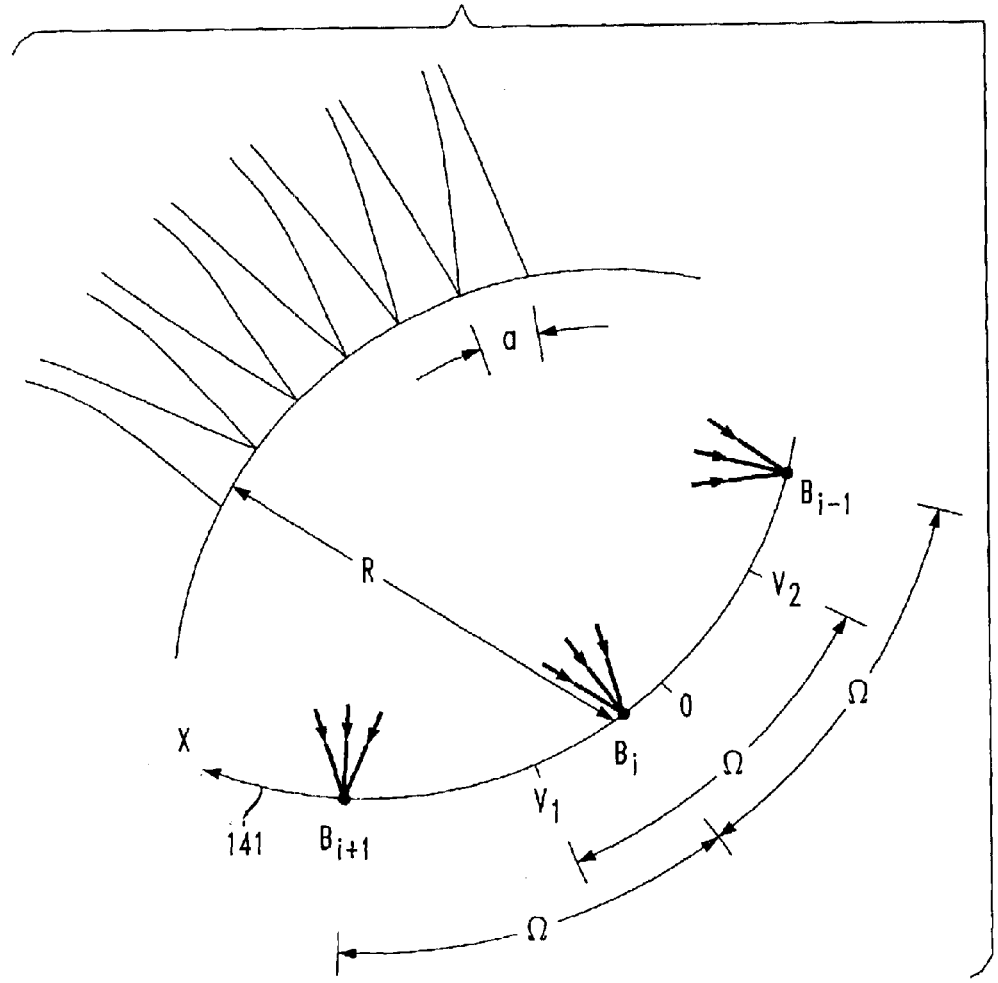
FIG. 2 shows the output free-space section of the wavelength router shown in FIG. 1.
Figure 3:
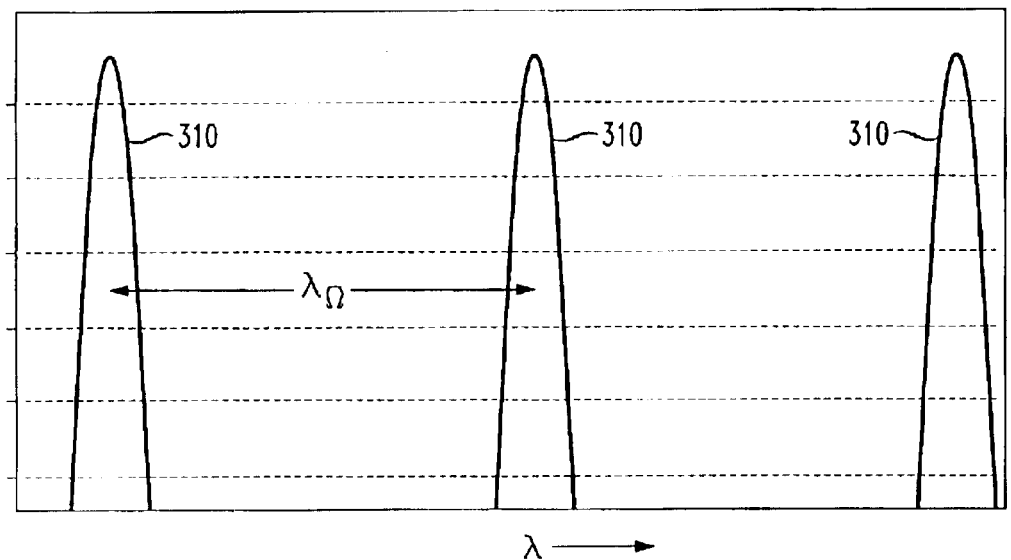
FIGS. 3 and 4 illustrate output characteristics of the basic wavelength router of FIG. 1.

In a conventional router, all the output ports or waveguides are located inside the central zone $\Omega_C$ (which in FIG. 2 represents the field of view $V_1 V_2$ of the router) and receive only the images produced in the central zone $\Omega_C$. In FIG. 1, only one output waveguide 180 is shown, and the input signal is efficiently transmitted to this waveguide at those wavelengths for which the central image location coincides with the particular waveguide location. As pointed out earlier, the principal image location is a periodic function of the signal wavelength. In each period, the image varies over the entire central zone $\Omega_C$. As a result, the transmission coefficient has the periodic behavior shown in FIG. 3, consisting of equally spaced lobes 310. Each lobe corresponds to a wavelength for which the image $B_i$ coincides with the output waveguide location. The period, given by the spacing $\lambda_{106}$ between lobes, is called the free-spectral range. In a conventional router images produced outside the central zone $\Omega_C$ (e.g., $B_{i-1}$ and $B_{i+1}$ of FIG. 2) are considered useless and so undesirable. Therefore, minimizing their intensities generally optimizes the router. To this purpose, one needs to optimize the radiation characteristics of the arms 160, since these radiation characteristics affect the intensities of the various images. Typically, the radiating apertures of the arms are arranged periodically ('a' in FIG. 2), thus forming a periodic array, and each aperture then produces the same radiation pattern, which is called the element pattern of the array. Maximum efficiency in the central zone $\Omega_C$ is obtained by designing the array in a known fashion, so that the element pattern ideally approximates a rectangular function, $$P(x) = rect\left(\frac{x}{\Omega}\right)$$

characterized by essentially unity amplitude inside the central zone $\Omega_C$ and essentially zero amplitude outside. Each arm in this case radiates its entire power inside the central zone $\Omega_C$, and unwanted images outside this item zone are effectively eliminated. In practice, such a rectangular function is difficult to realize, and a simpler design is typically used, producing the power pattern $$P(x) = \frac{\pi^2}{2}\left[\frac{\cos(\pi x/\Omega)}{(\pi/2)^2(\pi x/\Omega)^2}\right]^2$$

Figure 4:
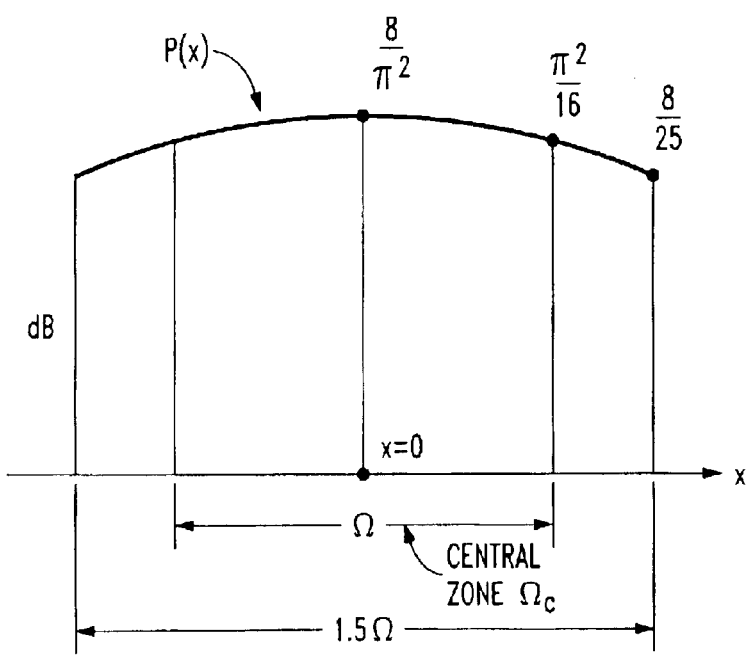

As shown in FIG. 4, this power pattern varies appreciably in the central zone $\Omega_C$ and, outside this zone, it produces appreciable values in the vicinity of the boundaries of the central zone $\Omega_C$.

However, the above variation is highly undesirable for my purpose here. I therefore use a reflective arrangement that substantially eliminates this problem, by equally reflecting all significant images. This essentially eliminates the above variation and, as a result, rectangular passbands are realized to a good approximation.

In FIG. 1 the amplitude of an image B as a function of the image coordinate x is determined by the element pattern P(x) specified by the radiation characteristics of the array at the end of the grating 150. The image amplitude is also a function of the source coordinate, and this function is determined by the element pattern of the receiving apertures illuminated by the input source A. Therefore the amplitude of an image B produced by a point source A of unit amplitude can be written as [4]

Figure 5:
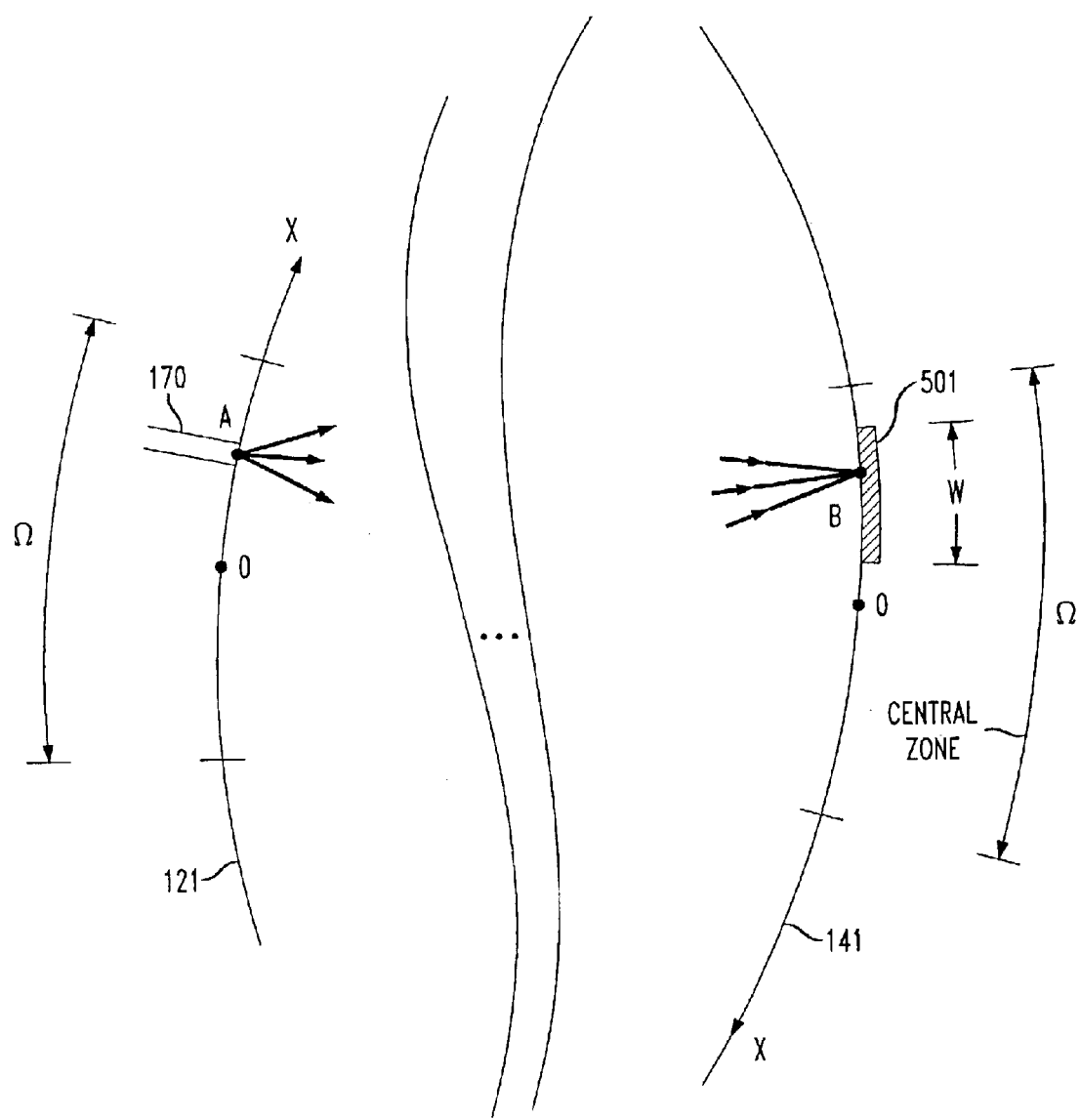
FIG. 5 shows an input point source located on the input circle of a wavelength router producing on the output circle a principal image illuminating a reflector of width W.
Figure 6:
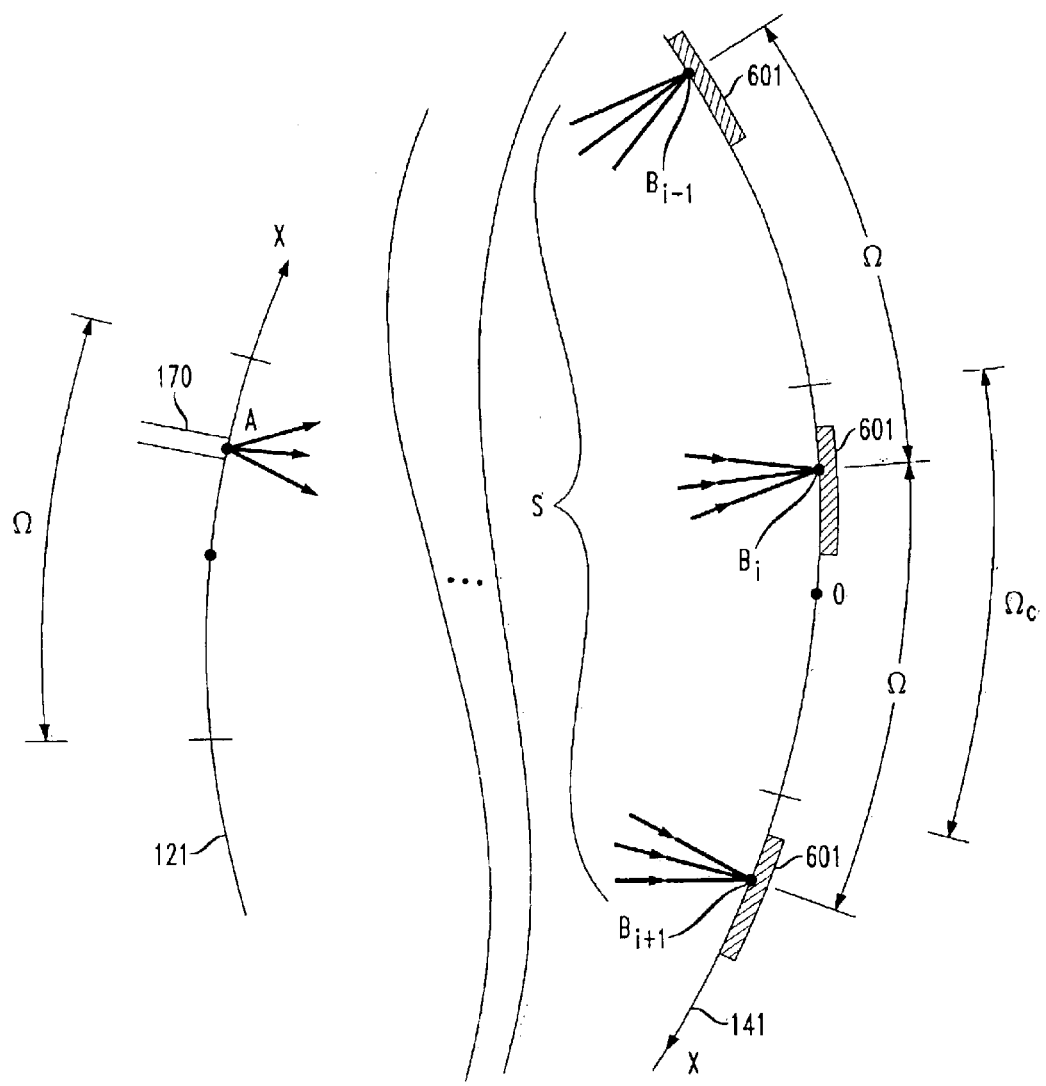
FIG. 6 shows an input source and its principal and secondary images produced by a router on a set of reflectors.
Figure 7:
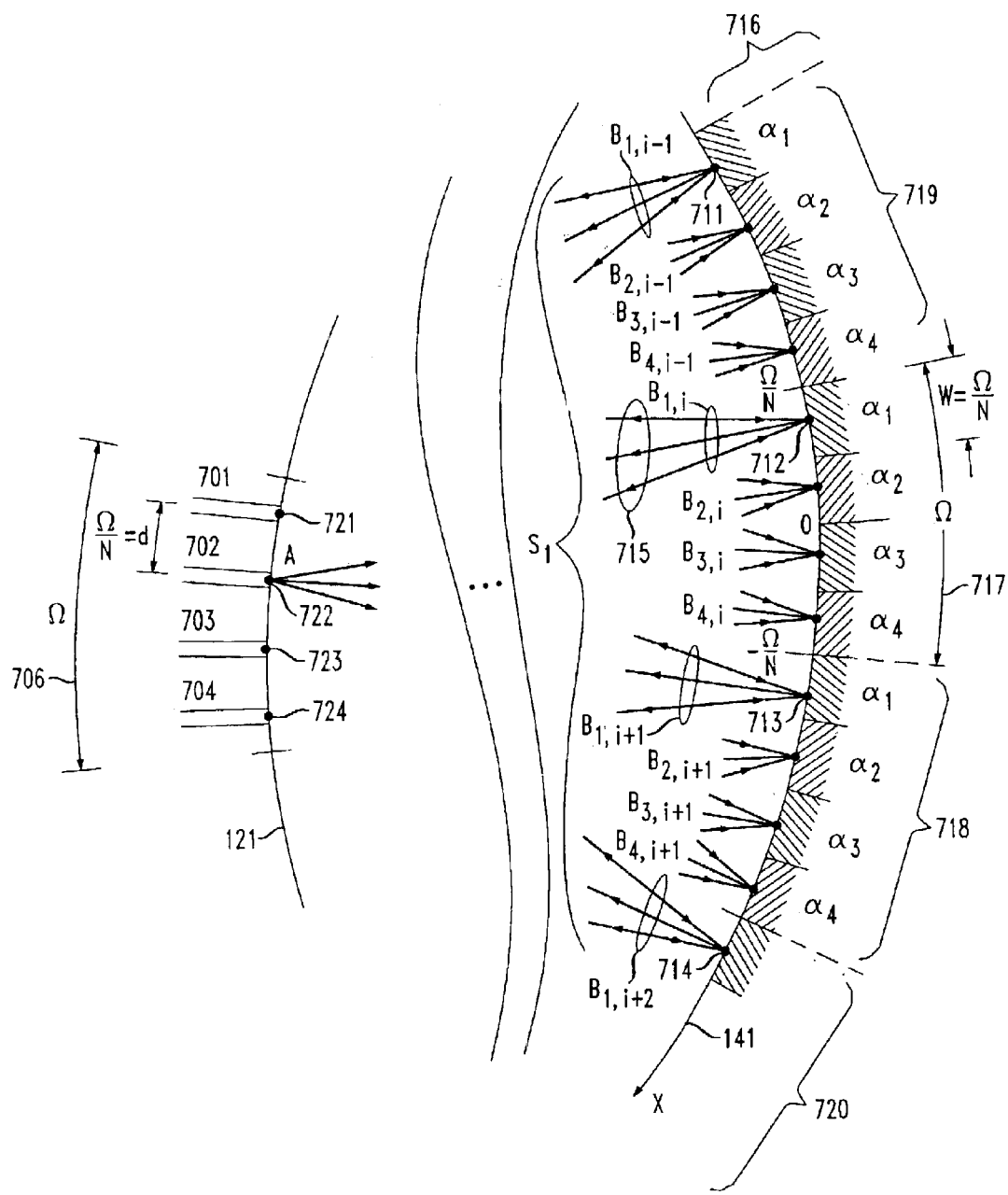
FIG. 7 shows four equally spaced waveguides connected to the input circle of a router. By including in the arms of the router a periodic phase variation with each period including four arms, an input signal applied at a particular wavelength to one of the four waveguides produces 4 sets of images. Each set consists of a principal image and its associated secondary images.

C(A)D(B)exp(jγ)

where the first factor, caused by the input element pattern, is a function of the source location A. The second term, caused by the output element pattern, is a function of the image location B, which varies with wavelength. The third term accounts for the phase shift γ caused by the optical path from A to B, and is be ignored, since it is irrelevant for my purpose. Now suppose the input signal is produced by an input waveguide 170 located at A and let B be the principal image. Let the signal be reflected back to the input waveguide, by placing at the image B location a reflector 501 of suitable aperture width W as shown in FIG. 5. The input signal then passes twice through the imaging arrangement and, after the second pass, it is transferred back to the input waveguide 170 with amplitude $C(A)^2 D(B)^2$. I have thus realized a filter, with reflection coefficient $C(A)^2 D(B)^2$ at those wavelengths for which the image is produced within the reflector aperture W. Notice that the reflector 501 produces a reflection band of width determined by the reflector width W. It is also recalled from [4] that the factor $C(B)^2$ is entirely caused by the secondary images produced by the grating. Therefore this factor can be eliminated by reflecting all images, by using a set of identical reflectors 601 spaced by $\Omega$ as in FIG. 6. The reflection coefficient is then approximately wavelength independent, but it depends, because of $C(A)^2$, on the input waveguide location A. This dependence is generally undesirable and it is therefore convenient to eliminate it as follows. With reference to FIG. 7, the arrangement considered here includes N waveguides, connected to the input circle 121. Then the above variation can be reduced by including a suitable loss in some of the waveguides. All reflections are then approximately characterized in each passband by the same intensity, and the two factors $C(A)^2 D(B)^2$ can be ignored.

Returning to FIG. 6, notice that the location of a particular image, produced by a particular order of the grating, is a monotonic function of the wavelength. On the other hand, the principal image B is defined as the particular image $B_i$ closest to the center O of the central zone $\Omega_C$. Thus, by increasing the wavelength, the principal image B exhibits cyclic behavior as it moves clockwise along the output circle 141. At the end of a particular cycle, characterized for instance by $B=B_i$, the principal image coordinate becomes equal to $\Omega/2$, and it is then replaced by a secondary image $B_{i-1}$ which has moved to the edge coordinate $-\Omega/2$, which starts a new cycle as the new principal image $B=B_{i-1}$ of the center zone $\Omega_C$. This cyclic behavior plays an important role in the arrangements considered here. The width $\lambda_\Omega$ of the wavelength cycle is the free-spectral range.

So far I have considered a conventional imaging arrangement FIG. 1 in which the various paths through the arms of the grating are characterized by a linear variation, producing a constant difference between adjacent paths. Then, as discussed earlier in FIG. 6, an input signal A applied at a particular input wavelength is transformed by the arrangement into a set S of images spaced by $\Omega$. On the other hand, to realize my novel wavelength interchanger, the grating must be modified, so as to cause each image to split into N equally spaced images, characterized by equal intensities and spaced by $\Omega/N$. Shown in FIG. 7 is an illustrative simplified wavelength router having N=4 input waveguides 701–704. FIG. 7 shows only one input source A being to split into N components producing N equally spaced images, $B_{1,i}$–$B_{4,i+1}$, in the central zone $\Omega_C$, 717, characterized by equal intensities and spaced by $\Omega/N$. Note that an input source A also splits into N equally spaced images, e.g., $B_{1,i+1}$–$B_{4,i+1}$, in the adjacent zone 718 as well as N equally spaced images in zones 718–720. Also note that an input source at one of the other waveguides 721, 723, and 724 would also be split into N equally spaced images, characterized by equal intensities, and produced at the same locations produced by the source A in the central zone 717 and adjoining zones 718–720.

Figure 7A:
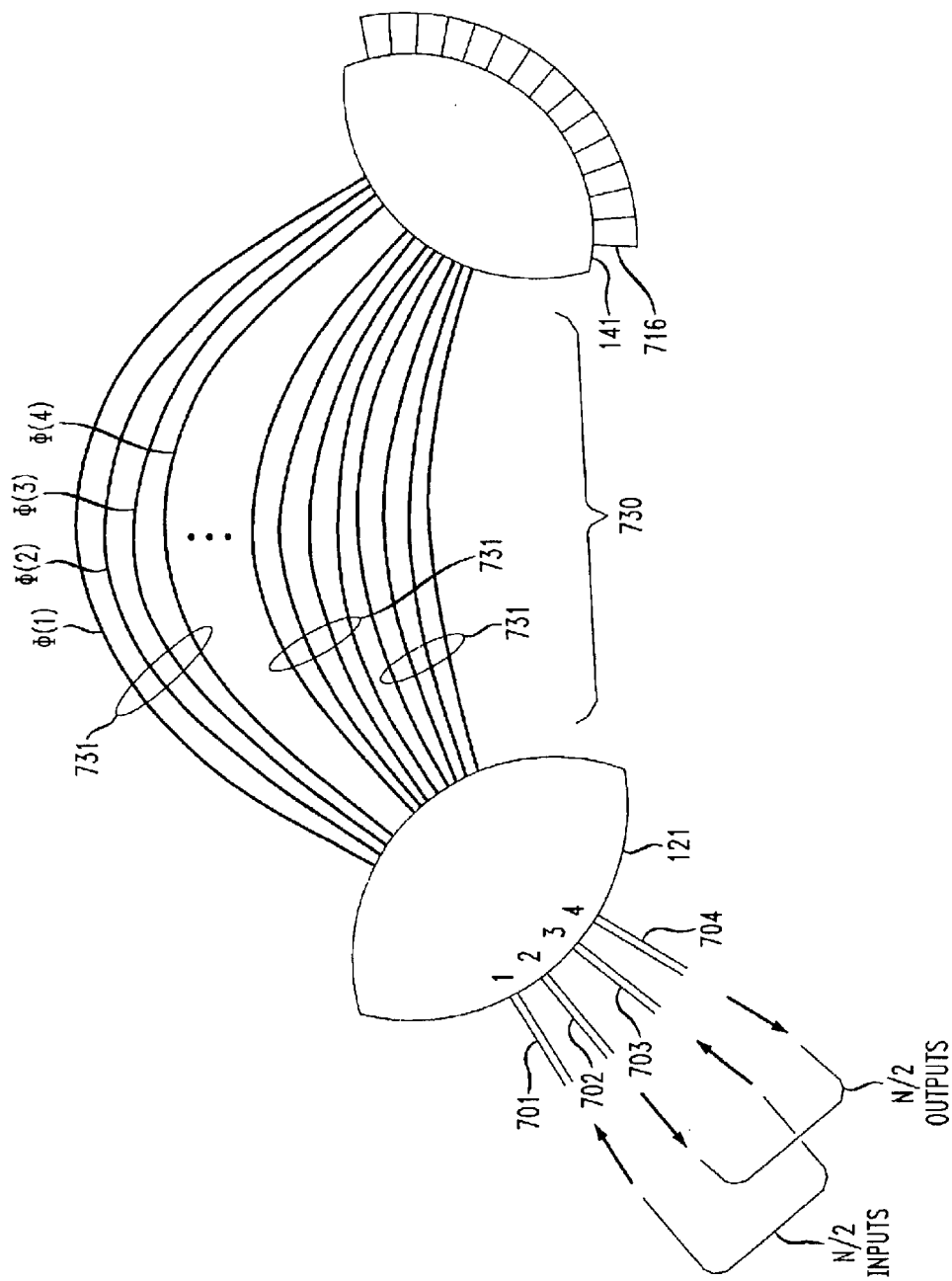
FIG. 7A shows a 2×2 wavelength interleaver realized using a waveguide router combined with a reflective arrangement consisting of a waveguide array combined with a circular reflector.

To enable an input source A to be split into N equally spaced images requires that the grating arms (or elements) have a periodic path length variation [2,3], superimposed onto the constant path length difference required by a conventional grating. Each period of the above variation must exactly include N grating elements (arms). Shown in FIG. 7A is an illustrative imaging arrangement showing the grating array 730 including the periodic sets 731 (N=4) of elements needed to produce the N=4 equally spaced images in each zone 717–720. It should be noted that, more generally, the total number of elements of the grating array 730 may not be an exact integer multiple of N. Illustratively, in FIG. 7, each periodic set 731 is shown to include 4 grating elements, each element of each set having a different phase shift $\phi(1)$–$\phi(4)$. More generally, the above periodic element path length variation produces in the i-th element of the grating a phase shift $\phi(i)=\phi(i+N)$ causing a phase factor $$f_i = \exp(j\phi(i)) \quad (1)$$

whose periodic variation can be shown to cause the above splitting of each set S of output images (produced at a particular wavelength) into N sets $S_1, \ldots, S_N$. The N sets are interleaved, with spacing $\Omega/N$ between adjacent sets, and each set is a replica of the original set. In FIG. 7A, N=4, and set $S_1$ illustratively includes the images $B_{1, i+2}$–$B_{1, i-1}$, set $S_2$ illustratively includes the images $B_{2, i+1}$–$B_{2, i-1}$, etc. The amplitude of each replica set is determined by the discrete Fourier transform of the phase factors $f_i$ and, therefore, it can be determined straightforwardly. Here, in order to realize an interleaver, the N sets must have equal intensity, and one can verify that this condition is realized, for even and odd values of N, by choosing respectively $$\phi(i) = \left| i^2 \frac{\pi}{N} \right|_{2\pi}, \left| i(i-1) \frac{\pi}{N} \right|_{2\pi}, \quad (2)$$

where $|\ |_{2\pi}$ denotes modulo $2\pi$. Indeed one finds that the amplitude of the p-th replica $S_p$ is given by $$t_p = \frac{1}{\sqrt{N}} \exp(j\gamma_p), \text{ with } \gamma_p = -\phi(-p), \quad (3)$$

$t_p$ being the ratio of the amplitude of $S_p$ divided by the original amplitude of $S_1$. Having thus produced equal intensities, for the N interleaved sets of images, I reflect the various images by using N interleaved sets of reflectors 716 located along the image circle 141. I realize each set by using a periodic arrangement of identical reflectors spaced by $\Omega$. Therefore each set reflects one principal image, e.g., 712, together with the corresponding secondary images, i.e., 711, 713, 714. The reflectors of a particular set must all produce the same reflection coefficient, given for the q-th set by $$r_q = \exp(j\alpha_q) \quad (4)$$

where $\alpha_q$ is a suitable phase shift that can be realized as discussed later.

Having thus reflected the N sets of images, the grating transforms the reflected images, e.g., 715, into a set of stationary images, 721–724, produced on the input circle 121. Since the N sets of reflected images on the output circle are equally spaced by $\Omega/N$ on output circle 141, the corresponding stationary images 721–724 produced on the input circle 121 are also spaced by $\Omega/N$. Therefore, by including in the central zone, 706 of input circle 121, N waveguides, 701, 702, 703, 704 spaced by $\Omega/N$ as shown in FIG. 6, each waveguide receives a respective one of the principal images, 721, 721, 723, 724. In particular, the reflected image 722 is produced at the location of the input waveguide 702. Notice that N=4 in our FIG. 7A example. I next derive the resulting transmission coefficients $T_{h,v}$ giving, for each pair of waveguides, the signal amplitude transferred to v-th waveguide when a signal of unit amplitude is applied to the h-th waveguide. I ignore for simplicity waveguide losses, and also losses caused by the factor C(A). As pointed out earlier, since all secondary images are reflected, the factor D(B) does not cause any loss. Under the above conditions power is conserved and $T_{h,v}$ can be determined as follows.

The value of $T_{h,v}$ is a sum of N contribution, produced respective by the N sets $S_q$ of reflected images. The contribution produced by the set $S_q$ can be shown to be $t_{q-h}t_{q-v}r_q$, giving $$T_{h+s,v+s} = \sum_{q=0}^{N-1} t_{q-h}t_{q-v}r_{q+s} \quad (5)$$

Clearly maximum transmission between two particular waveguides is realized by properly choosing the phase shifts $\alpha_q$ so that all contributions have the same phase for two particular values $v_0$, $h_0$ of v, h, $$|T_{h_0, v_0}|=1,$$

causing the $h_0$-th input signal to be entirely transferred to the $v_0$-th waveguide. The above condition requires $\alpha_q=\phi(q-v_0)+\phi(q-h_0)$, giving $$\alpha_q = \left| 2\phi(-q) - 2qu\frac{\pi}{N} \right|_{2\pi} \quad (6)$$

with $u=v_0+h_0$. Having thus obtained unity transmission between two particular waveguides, we note from the above expressions that the same result, $$|T_{h,v}|=1$$

will be also obtained between all pairs of waveguides h, v specified by $$|h+v=u|_N \quad (7)$$

where $|\ |_N$ denotes modulo N. Notice the integer u specifying the reflection coefficients $r_q$ can be chosen arbitrarily. Therefore a total of N different configurations, called states, are obtained by choosing $u=1, \ldots N$. Each state is characterized by total power transfer from each waveguide to a corresponding waveguide specified by (7).

Another important property is obtained by changing the angles $\alpha_q \rightarrow \alpha_{q+s}$. One can verify that this simply causes $u \rightarrow u+2s$, and therefore one obtains instead of (7)

$$|h+v=u-2s|_N \quad (8)$$

Therefore, if the locations of the reflection coefficients are shifted by s, so as to change $r_q \rightarrow r_{q+s}$, this shifts by 2s the output waveguide location of maximum transmission, for a given input waveguide location. Notice, if N is even, then by changing s, keeping u fixed, only half of the total number of states N are obtained. Namely, either the even or odd states are obtained, depending on whether u is even or odd. An important consequence of this result is obtained next by considering the wavelength dependence of $T_{h,v}$.

Initially I assume that the above results are obtained at a particular center wavelength $\lambda_0$ for which the images on the output circle are located at the centers of the reflectors. It is recalled that each image location is a function of the wavelength. Therefore, if the reflectors have width $\Omega/N$, then each image is reflected by a particular reflector over a wavelength interval of width $\lambda_\Omega/N$ centered at $\lambda_0$. A constant reflection coefficient is therefore produced over this interval, and therefore unity transmission is realized, between corresponding pairs of waveguides, over a passband width $\lambda_\Omega/N$ centered at $\lambda_0$. I next change the wavelength from $\lambda_0$ to $\lambda_s=\lambda_0+s\lambda_\Omega/N$. This causes a corresponding shift by $s\Omega/N$ in the locations of the various images. As a result each image experiences the change $r_q \to r_{q+s}$ and I obtain again condition (8), showing that the state of the arrangement changes by 2s.

The most important states, for my purpose here, are the odd states obtained for even N. A remarkable property of these states is that unity transmission is produced between different waveguides. Therefore, by using for instance the odd waveguides as input waveguides, maximum transmission is always produced to the even waveguides. This arrangement is shown in FIG. 7A and is analogous to a conventional N/2×N/2 router. The only two differences are 1) that it is characterized by rectangular transfer functions, FIG. 13, and 2) each state can be changed by applying (modulo $2\pi$) a suitable shift $r_q \to r_{q+s}$ to the reflection coefficients (thus changing by 2s the state parameter u). I next further discuss the result (8), assuming that it is produced at the wavevength $\lambda_s=\lambda_0+s\lambda_\Omega/N$ by the reflection coefficient (6).

Figure 8:
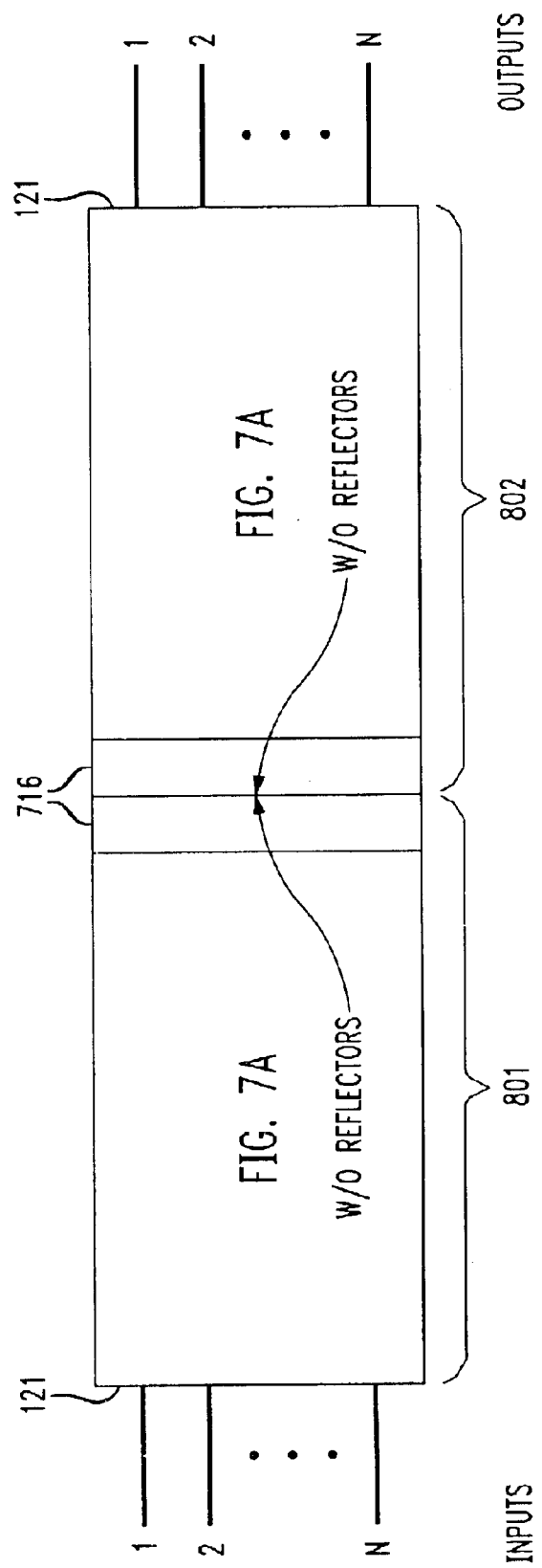
FIG. 8 shows a block diagram of two wavelength routers arranged back-to-back as a transmissive N×N wavelength interleaver.
Figure 11:
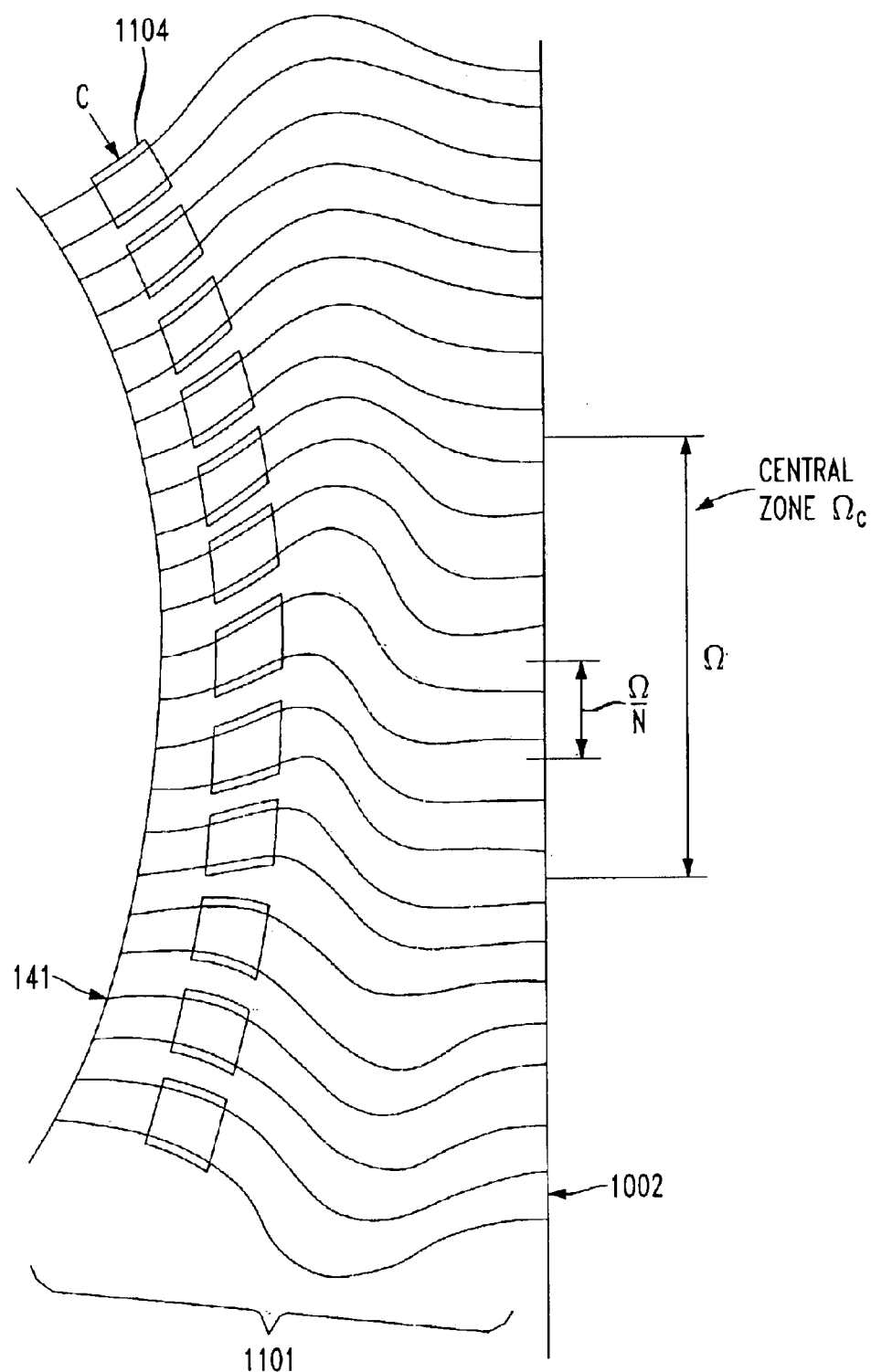
FIG. 11 shows a third reflector arrangement consisting of a waveguide array formed between between a circle and a straight reflector.

The expression (8) is periodic in both u and 2s with period N. Therefore a total of N states can be produced, by varying u. On the other hand, by varying $\lambda_s$ for a given u, different results are obtained depending on whether N is odd or even. In the former case, odd N, each cycle includes the total number N of states. In the latter case, only half of the states are included. Both properties are useful. The first property is useful to realize a N×N device by cascading two gratings. The second property allows a N/2×N/2 transmission device 800 to be implemented as shown in FIG. 8 by using two grating arrangements 801, 802, similar to FIG. 7A, but without reflective terminations of the array units 716. Notice, since the two arrangements are connected back-to-back, each unit 716 must be realized in this case by using the array geometry of FIG. 11. Since the N×N device 800 operates in a transmission mode, the array unit 716 of both grating arrangements 801, 802 would still include the phase shifts $\alpha_q$. By making the phase shifts switchable (as discussed later) the N×N device 800 can be made to operate as an N×N switch device.

The second of the aforementioned two properties allows an N/2×N/2 device to be realized using a single grating as in FIG. 7A. In either case, since the N/2×N/2 device of FIG. 7A and the N×N device of FIG. 8 each have separate input and output waveguides, they do not require circulators to separate input and output signals, yet each device performs periodic wavelength slicing/interchanging similar to that of a conventional N×N router [1]. While the new devices of FIGS. 7A and 8 are more difficult to realize, they have two important advantages, namely a rectangular response can be realized, and the configuration determined by u can be varied by changing the phase shifts $\alpha_q$.

To summarize, I have shown that N must be odd, in order to realize the above N×N device characterized by the complete set of N states. On the other hand, I have shown that if N is even then each wavelength cycle only includes N/2 states, namely either the even or the odd states, depending on whether u is even or odd. In the former case, by choosing odd u, I have realized a N/2×N/2 router by using a single grating. Only the odd states are needed in this case. For each odd state, the router connects each even waveguide to an odd waveguide and therefore, by applying for instance the input signals to the odd waveguides, the output signals are transferred to the even waveguides as in FIG. 7A. The remaining problem, considered in a following section, is to realize accurately and efficiently the appropriate phase shifts $\alpha_q$ by using a simple arrangement. The N/2×N/2 router can also be used as a switch, as illustrated below by a simple example.

AN EXAMPLE

Consider for instance the arrangement of FIG. 7A designed according to Equation (2) by choosing for N=4

$$\varphi(1) = 0, \varphi(2) = \frac{\pi}{4}, \varphi(3) = \frac{\pi}{2}, \varphi(4) = \frac{3\pi}{4}$$

By then setting the angles $\alpha_q$ to the particular values given by (6) for u=1, I obtain at $\lambda_0$ $$|T_{1,2}|=|T_{2,1}|=1, |T_{3,4}|=|T_{4,3}|=1$$

whereas, by changing the value of u to u=3, $$|T_{1,4}|=|T_{4,1}|=1, |T_{3,2}|=|T_{2,3}|=1$$

Thus in FIG. 7A, by applying input signals to ports 1,3 and using ports 2,4 as output ports, I obtain a 2×2 switch and the above two states correspond to the familiar bar and cross states, respectively causing connections between the ports 1→2, 3→4 and 1→4, 3→2. As discussed later, this switching can be accomplished using heaters to control the thermooptic effect of waveguides to provide the desired phase the angles needed to switch between the bar and cross states.

The various connections performed by each state can be conveniently displayed by a N×N matrix, in which for instance the u-th row represents a particular state and the h-th element of a particular row gives the destination (value of v) for the h-th input signal. For instance, in the above example one obtains the state matrix 1, 2, 3, 4
2, 3, 4, 1
3, 4, 1, 2
4, 1, 2, 3

Notice I have obtained a total of 4 states, but only the odd states given by the first and third row are of use here. By using my reflective arrangement with input signals applied to ports 1,3 and output signals transferred to ports 2,4, I obtain a 2×2 switch and the above two states correspond to the familiar bar and cross states, respectively causing connections between the ports 1→2, 3→4 and 1→4, 3→2.

While in the above example I had considered only an N/2×N/2 device, it should be noted that my technique may also be used to implement an N/2×1 combiner or a 1×N/2 splitter.

Reflective Elements

With reference to FIG. 7, a rectangular response can then be realized by dividing each zone 717–720 of the output circle 141 into segments of equal width W=$\Omega$/N, and producing a constant reflection equal to $r_q$ (with phase shift $\alpha_q$) over the entire width of the q-th segment. Then, each passband of a particular transmission coefficient $T_{h,v}$ has width equal to $\lambda_\Omega/N$ and the passband is repeated with period $\lambda_\Omega$. For a particular h, the transmission coefficients $T_{h,v}$ are displaced from each other by multiples of $\lambda_\Omega/N$. So far I have considered only unity magnification. More generally, a larger magnification may be required to increase the size of each zone on the image circle, in which case the width of each segment and their spacing must be multiplied by the magnification.

Figure 9:
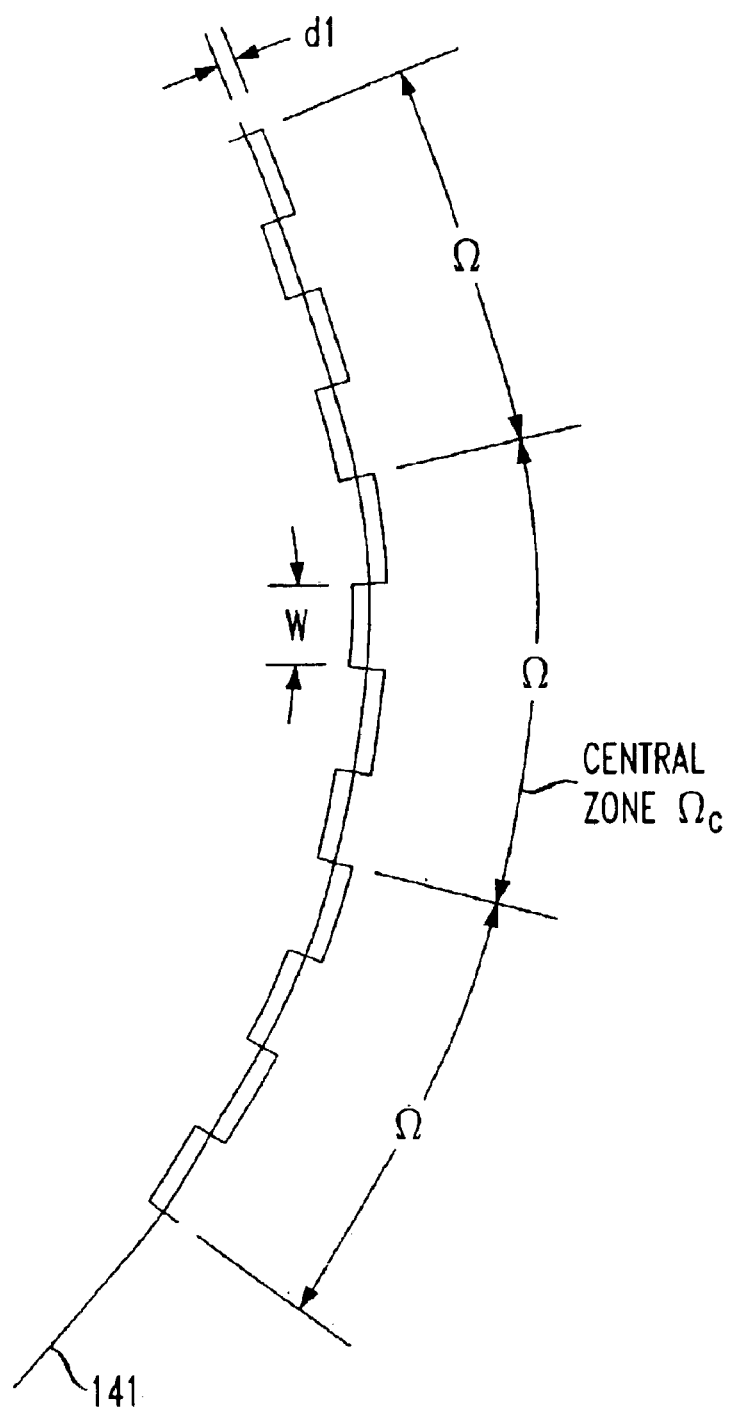
FIG. 9 shows a first reflector arrangement consisting of a segmented reflector.

I next consider the problem of realizing the appropriate phase shifts $\alpha_q$. One could use to this purpose a set of reflectors, slightly displaced from the image circle as shown in FIG. 9. The appropriate $\alpha_q$ can then be realized, over the entire width W of each reflector, by properly choosing the reflector displacement from the image circle. It is probably difficult, however, to obtain sufficient accuracy by this technique. Moreover, one may want to control the phase shifts after fabrication, for three reasons. One reason is that small adjustments (trimming) may be needed after fabrication in order to realize the specified rejection (typically more than 30 dB) in the stopbands. A second reason arises if a switch with variable filter response is required. Then, in order to vary the filter configuration, suitable phase shifts must be applied by suitable controls, for instance by using the thermooptic effect. Thus, by controlling the values of the phase angles $\alpha_q$ of Equation (6) one can enable the N/2×N/2 device to switch between the bar and cross states. It is then convenient to use to this purpose a waveguide array, so that the phase shift in each segment can be varied by varying the effective index of the waveguides included in that segment. I next describe two different types of waveguide arrays that can be used to this purpose.

Figure 10:
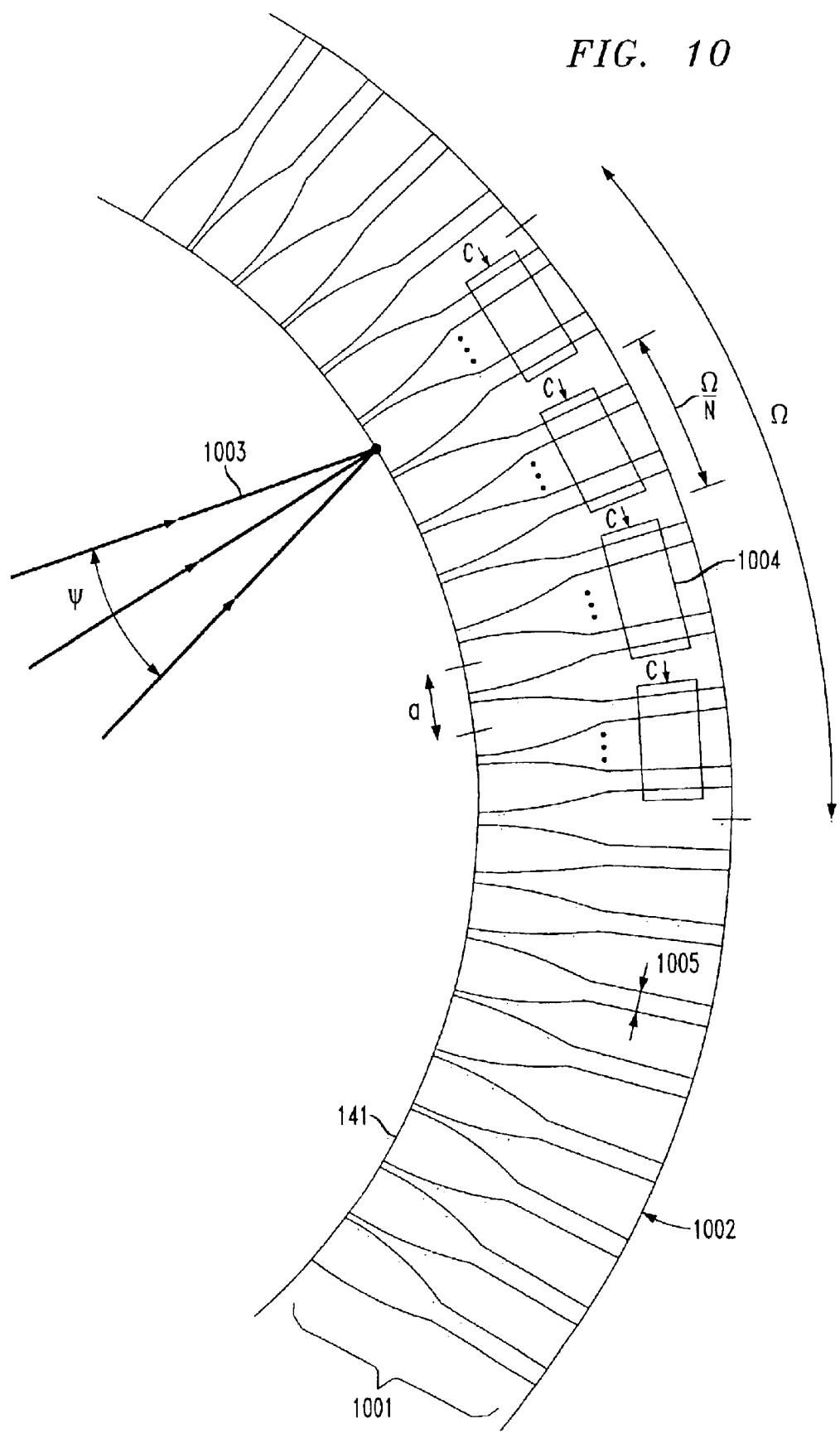
FIG. 10 shows a second reflector arrangement realized using an array of radial waveguides combined with a circular reflector.

With reference to FIG. 10, I first describe a conventional waveguide array formed between the image circle 141 and a circular reflector 1002. The array 1001 can be viewed as a sampling filter that transforms the incident field into a discreet set of modes, each propagating in a particular waveguide. The incident field 1003 producing a particular image can be viewed as a band limited packet of waves, with propagation directions confined within a finite angular aperture width $\Psi$. Then, according to the sampling theorem, the waveguide spacing a must satisfy the condition $\Psi < \lambda/a$, which is required for efficient sampling by the array. Then assuming that the array efficiency determined by the array element pattern is close to 100% in the above interval $\Psi$, and neglecting aberrations caused by mutual coupling, the array reflection coefficient determined by a particular waveguide is close to unity. Moreover, the reflection coefficient phase is determined by the waveguide optical length, which is given by the actual length multiplied by the waveguide propagation constant. In particular, by using waveguides of the same length as in FIG. 10, the appropriate phase shifts can be realized by properly choosing the widths 1005 of the various waveguides. It is also possible to modify the waveguide geometry as in FIG. 11, by terminating the various waveguides with a straight reflector 1102, instead of a circular reflector 1002 as in FIG. 10. As pointed out earlier, different phase shifts $\alpha_q$ must be produced in different segments of width W and each segment must produce the same phase shift $\alpha_q$. Thus, in each segment, all waveguides must have the same optical length. The number N of segments in the example of FIG. 7a is 4. In FIG. 10 each segment includes two waveguides and, in this case, the phase shift $\alpha_q$ in each segment can be varied by simultaneously controlling the optical path length of both waveguides. While the number of waveguides located in each segment of FIG. 10 is illustratively shown as two, it should be noted that the number of waveguides located in each segment more typically would exceed ten. If both of the arrangements of FIGS. 10 and 11 were to be part of a N/2×N/2 switch device, e.g., a 2×2 switch, then a suitable signal C must control each variable phase shift unit 1004. One such unit 1004 could utilize a heater to control the thermooptic effect of the waveguides in a particular segment and, consequently, the phase shift produced by that segment. In this manner the signals received over port 1 and 3 of FIG. 7A can be switched from 1→2 and 3→4 to, respectively, 1→4 and 3→2, under control of control signal C. In a similar manner, the signal C can also be used to trim the value of the phase shift of a waveguide of the N/2×N/2 device. Using these techniques, I can (1) trim the value of the phase shift of a waveguide of the N/2×N/2 device or (2) change the value of the phase shift of an array segment enough to enable the N/2×N/2 device to act as a N/2×N/2 switch.

Figure 12:
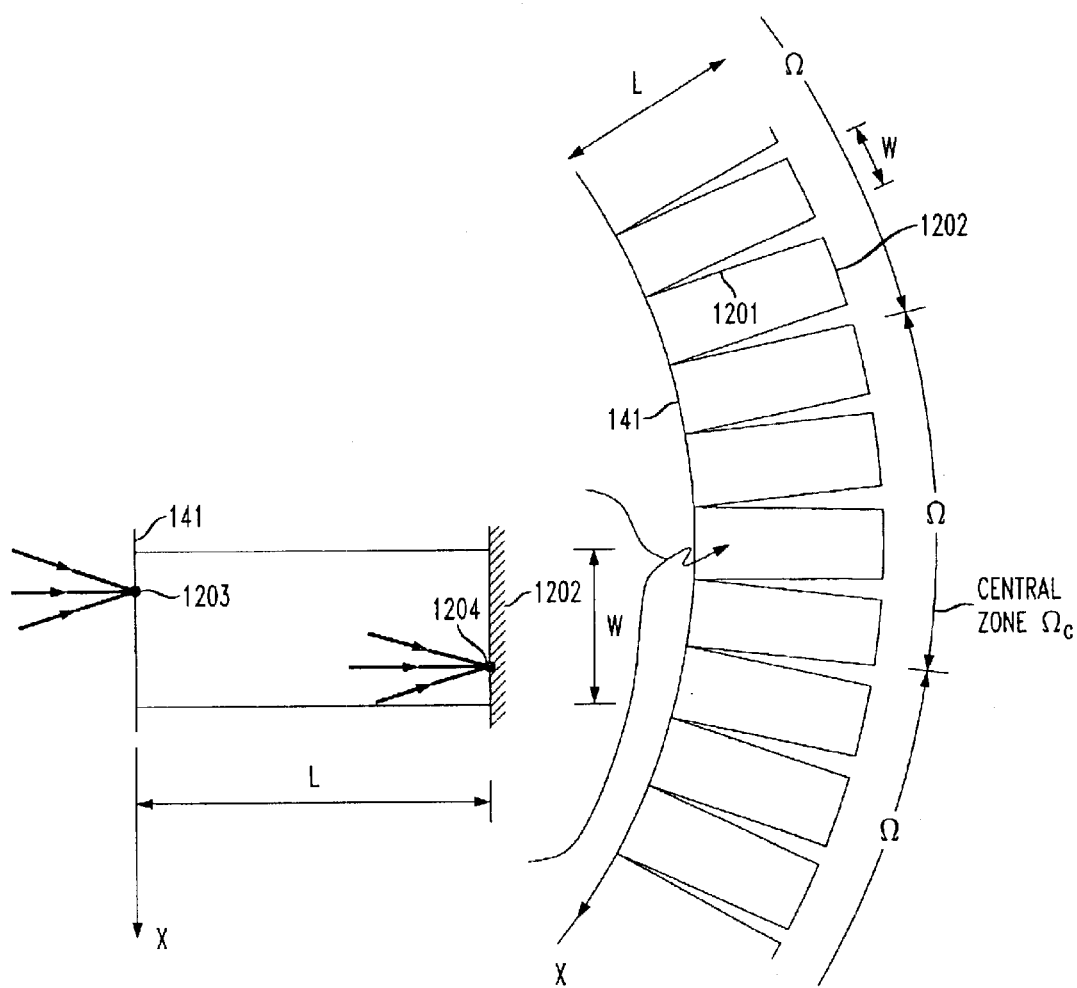
FIG. 12 shows a fourth reflector arrangement realized using an array of multimoding waveguides.
Figure 13:
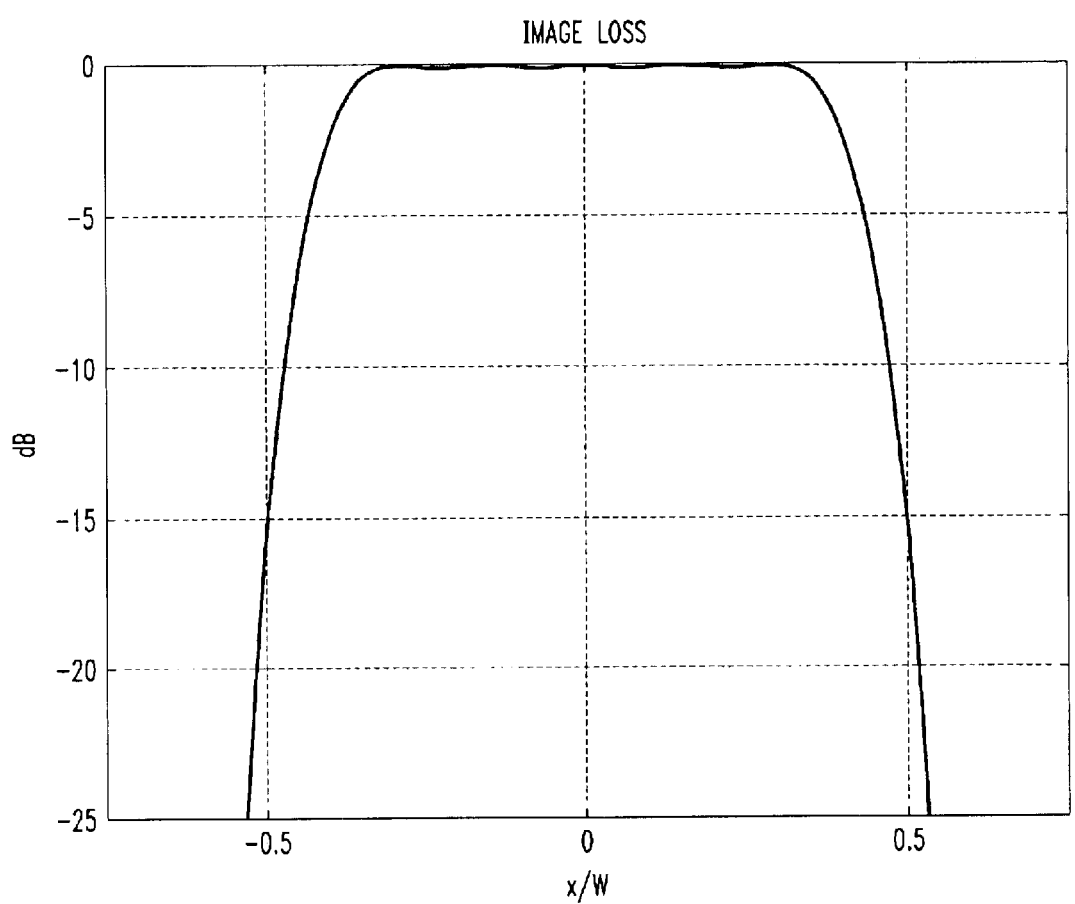
FIG. 13 shows the rectangular wavelength transfer function of my wavelength router.
Figure 14:
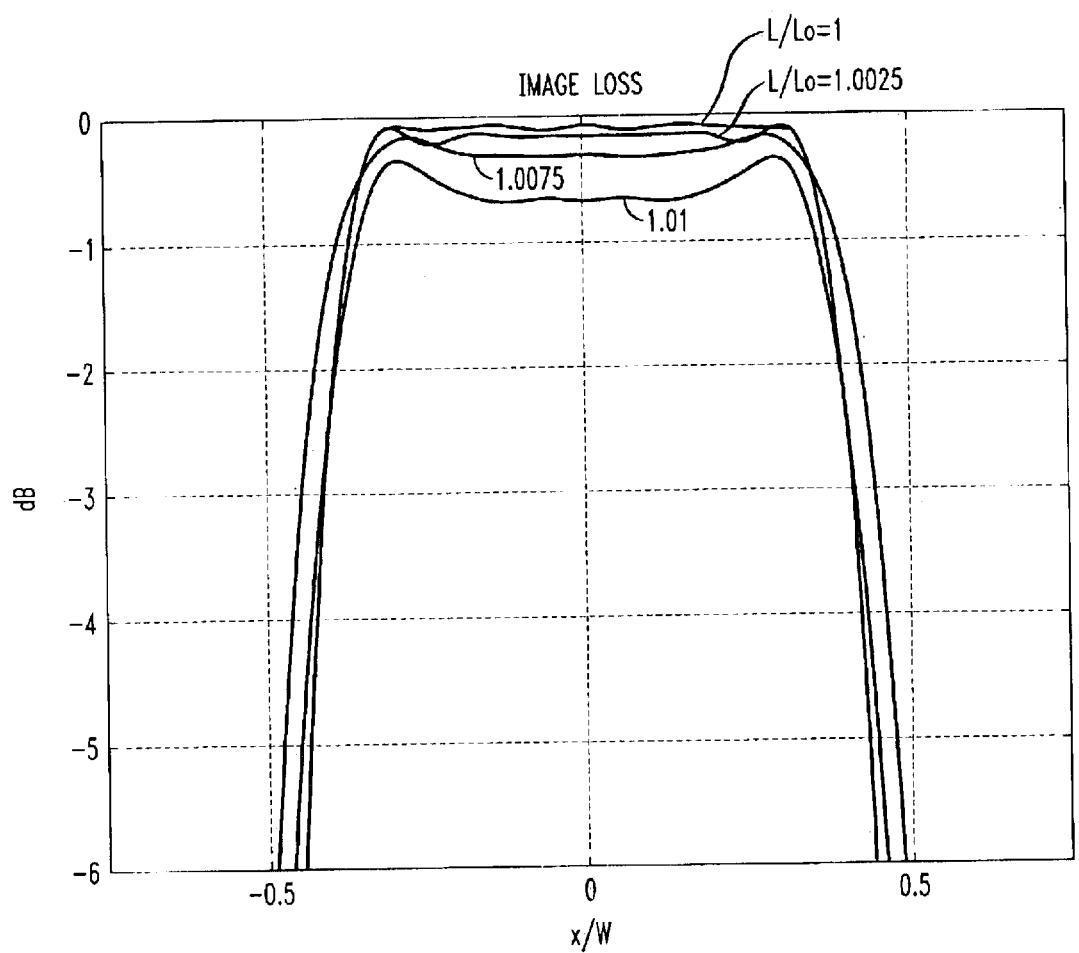
FIG. 14 shows the rectangular wavelength transfer function of my wavelength router for different $L/L_o$ ratios.

I next describe an alternative technique to obtain the desired phase shift in the reflector element. Instead of using a conventional waveguide array, an array of imaging elements as illustrated in FIG. 12 may be used. In this case each reflective element consists of a multimoding waveguide 1201 of length L terminated by a reflector 1202. By properly choosing L, the incident distribution 1203 produced over the input aperture of the multimoding waveguide is transformed by the waveguide into an inverted replica 1204 illuminating the reflector 1202. Thus the reflective waveguide is approximately equivalent to a reflector of width W located on the image circle 141. As shown below, the loss is small, and it does not depend critically on the exact length L. The fabrication is fairly simple, since the various elements can be initially realized of approximately the same length, and the appropriate phase shifts $\alpha_q$ can be included by slightly adjusting the various lengths, by using for instance the previously described thermooptic effect. Moreover, if only fixed values of $\alpha_q$ are required, they can be realized by suitable trimming of the individual elements after fabrication. The optimum length L is accurately determined by the propagation constants $\beta_0$, $\beta_1$ of the two lowest modes, and it is approximately given by $$L_o \simeq \frac{3\pi}{\beta_0 - \beta_1} \simeq \frac{2\beta_0 W^2}{\pi}$$

and FIG. 13 shows the calculated behavior of $|T_{h,v}|^2$ over a wavelength interval corresponding to the width W. In this example the required length is approximately $L_o$=10 mm assuming silica, and the multimoding waveguide supports 9 modes, whose finite number causes a small ripple. Also shown in FIG. 14 are the wavelength responses for $L/L_0 \cong 1.00, 1.0025, 1.0075, 1.01$, and one can see that a rectangular response is realized to a good approximation in all cases.

So far I have considered imaging by a planar arrangement using a waveguide grating located between an input reference curve and an output image curve produced with unity magnification. This arrangement is attractive because it can be realized in integrated form, but it is important to realize that the above techniques apply in general to any imaging arrangement using a diffraction grating. In particular, the imaging arrangement can be realized using an Echelle grating, which is a well-known type of grating characterized by a large path length difference between adjacent elements. The Echelle grating can be incorporated in a planar imaging arrangement, or in a conventional imaging arrangement (possibly including a lens or a curved reflector combined with an Echelle) realized in ordinary free-space. Moreover, an arbitrary magnification factor M can be realized in general between the input curve and a suitable image curve.

Figure 15:
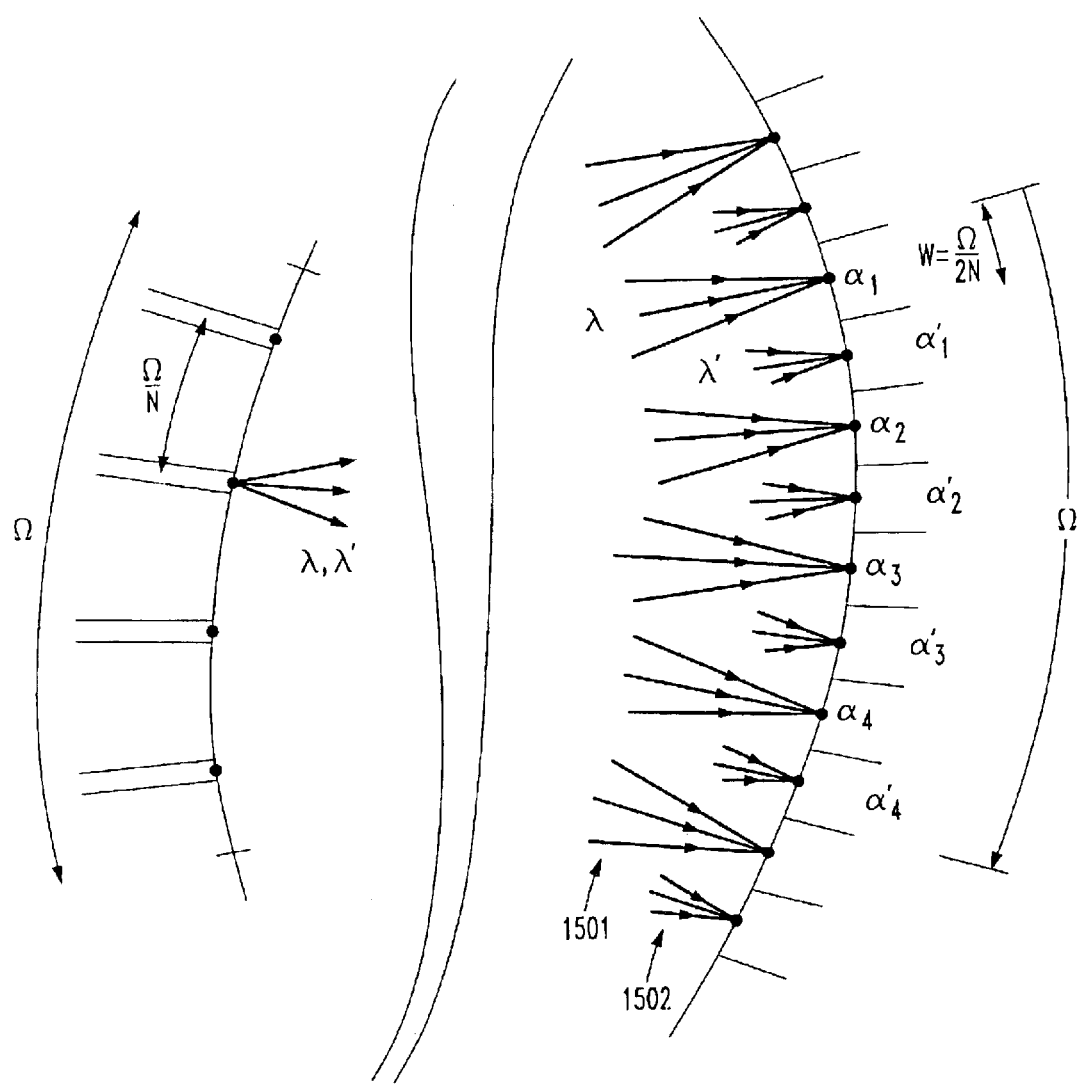
FIG. 15 shows two sets of images produced at two different wavelengths $\lambda$, $\lambda'$. The two sets illuminate different combs of reflectors. Each reflector has width $W=\Omega/2N$ and the two combs are characterized by different phase shifts $\alpha_i$, $\alpha'_i$.

Thus far we have realized a rectangular response by dividing each zone 717–720 of the output circle 141 into segments of equal width $W=\Omega/N$, and producing a constant reflection equal to $r_q$ (with phase shift $\alpha_q$) over the entire width of the q-th segment. Then, each passband of a particular transmission coefficient has width equal to $\lambda_\Omega/N$ and the passband is repeated with period $\lambda_\Omega$ or $\lambda_\Omega/2$, depending on whether N is odd or even. As a consequence, in each period the number of passbands is respectively N and N/2, in the above two cases. More generally, it is important to realize that the number of passbands can be increased by a factor M by reducing, by the same factor M, the width $W=\Omega/N$ of each segment. For instance, by reducing the width W by a factor M=2, as shown in FIG. 15, I can double the number of segments, thus doubling the number of passbands. The arrangement, instead of including one comb of interleaved sets of reflectors ($\alpha_1$–$\alpha_4$), as shown in FIG. 7, now includes two such combs ($\alpha_1$–$\alpha_4$, $\alpha'_1$–$\alpha'_4$), as shown in FIG. 15, with all considerations made previously for a single comb arrangement also applying to the two comb arrangement. By choosing different reflection coefficients for the two combs, we now have two combs of passbands, and each passband now has a width $\lambda_\Omega/2N$. More generally, any integer value can be chosen for the factor M, and different combs need not have the same width. FIG. 15 shows for M=2, two sets of images, 1501, 1502 produced at two center wavelengths $\lambda$, $\lambda'$ spaced by $\lambda_\Omega/2N$. Notice the two sets of wavelength images 1501, 1502 illuminate different combs of reflectors $\alpha_1$–$\alpha_4$, $\alpha'_1$–$\alpha'_4$. Each reflector has a width $W=\Omega/2N$ and the two combs are characterized by different phase shifts $\alpha_i$, $\alpha'_i$.

Another interesting arrangement is, instead of using a set of N waveguides, to include M interleaved sets, each set consisting of N waveguides. Such an arrangement would realize for odd values of N an MN×MN router by using two gratings and, for even N, an MN/2×MN/2 router is realized by using a single grating.

REFERENCES

[1] Dragone, C., U.S. Pat. No. 5,136,671, "Optical Switch, Multiplexer, and Demultiplexer," Issued Aug. 4, 1992.
[2] Dragone, C., U.S. Pat. No. 6,023,544, "Monitoring with an Optical Wavelength Router," Issued Feb. 8, 2000.
[3] Doerr, C. R., U.S. Pat. No. 6,049,640, "Wavelength-Division-Multiplexing Cross-Connect Using Angular Dispersive Elements and Phase Shifters," Issued Apr. 11, 2000.
[4] Dragone, C., "Optimum Design of a Planar Array of Tapered Waveguides," J. Opt. Soc. Amer. A., Vol. 7, No. 11, pp. 2081–2093, November 1990.

What is claimed is:

1. A waveguide grating router comprising a grating having an input curve and an output image curve, the input curve having N, N>2, equally spaced waveguides connected thereto, the output curve having reflective elements placed thereon, the waveguide grating router characterized by
   the grating having a plurality of elements forming multiple paths through the router so as to transform a particular input wavelength applied to one of the N waveguides into N components producing N interleaved sets of images wherein each set of images consists of different orders of the grating router and said set is produced by one of the N components and
   the output curve including N interleaved sets of reflective elements that have predefined phase shifts between the sets and are arranged so that all significant orders of each image set are reflected back through the router so as to efficiently transfer said particular input wavelength back to a selected one of the N waveguides, and wherein the selected waveguide is determined by preset phase shifts produced by the sets of reflective elements.

2. The waveguide grating router of claim 1 wherein
   each of the reflective elements of the N interleaved sets has width essentially equal to $\Omega/N$, where $\Omega$ is the spacing of the images in each set of images and
   the spacing of the N waveguides is essentially equal to $\Omega/N$ divided by the magnification of the images.

3. The waveguide grating router of claim 1 wherein the N interleaved sets of reflective elements have element width essentially equal to $\Omega/N$ and they essentially produce a constant reflection over the width of each element.

4. The waveguide grating router of claim 1 wherein the grating includes a periodic path length component with period N so that the array elements are divided into a plurality of groups, each group consisiting of N consecutive elements and each of the N elements having a predetermined phase shift caused by the above path length component, so as to essentially split each input wavelength into N components, each illuminating one of the N sets of reflectors.

5. The waveguide grating router of claim 1 wherein
   the two sets of reflective elements include means for adjusting the preset phase shifts.

6. The waveguide grating router of claim 5 wherein the means for adjusting the preset phase shifts includes thermooptic devices operable under control of a control signals.

7. The waveguide grating router of claim 1 wherein N equals 4.

8. The waveguide grating router of claim 1 arranged as a N/2×N/2 switch having the N waveguides divided into two interleaved sets respectively composed of N/2 input waveguides and N/2 output waveguides and wherein the relative phase shifts of the N sets of reflective elements are controlled by control signals to switch an optical signal received by at least one of the N/2 input waveguides to any of the N/2 output waveguides.

9. The waveguide grating router of claim 1 wherein
   at least one of the N interleaved sets of reflective elements is displaced from the output image curve.

10. The waveguide grating router of claim 1 wherein
    at least one reflective element of at least one set of the N interleaved sets is realized using an array of waveguides combined with reflective terminations.

11. The waveguide grating router of claim 10 wherein
    each waveguide is a multimoding waveguide.

12. The waveguide grating router of claim 10 wherein
    all waveguide terminations are arranged along a straight surface.

13. The waveguide grating router of claim 1
    wherein a comb of M input wavelengths, which are equally spaced within a free spectral range of the router, are all applied to one of the N waveguides and are transformed by the router into M N components producing M N interleaved sets of images, wherein each set of images consists of different orders of the grating router and said set is produced by one of the M N components,
    the spacing of the N waveguides is equal to $\Omega/MN$, where M an integer greater than one and $\Omega$ is the spacing of the images in each set of images, and
    the output curve including MN interleaved sets of reflective elements that have predefined phase shifts between the sets, each of the reflective elements has a width equal to $\Omega/MN$, and are arranged so that all significant orders of each image set are reflected back through the router so as to efficiently transfer anyone of said M input wavelengths back to a selected one of the N waveguides, and wherein the selected waveguide is determined by preset phase shifts produced by the sets of reflective elements illuminated by the particular input wavelength in question.

14. An imaging arrangement comprising a diffraction grating having an input curve and an output image curve, the input curve having N, N>2, equally spaced waveguides connected thereto, the output curve having a plurality of spaced reflectors arranged thereon, the imaging arrangement characterized by the diffraction grating consisiting of a plurality of elements forming multiple paths through the router so as to transform a particular input wavelength applied to one of the N waveguides into N components producing N interleaved sets of images wherein each set of images consists of different orders of the grating router and it is produced by one of the N components and wherein the output curve includes N interleaved sets of reflective elements that have predefined phase shifts between the sets and are arranged so that all significant orders of each image set are reflected back through the router so as to efficiently transfer said particular input wavelength back to a selected one of the N waveguides, and wherein the selected waveguide is determined by preset phase shifts produced by the sets of reflective elements.

15. The imaging arrangement of claim 14 wherein the diffration grating is an Echelle grating.

16. A waveguide grating router comprising a first grating having an input curve and an output image curve, the input curve having N, N>2, equally spaced input waveguides connected thereto, the output curve connected to N interleaved sets of arrays of coupling waveguides placed between said output curve and the input curve of a second waveguide grating;

the second grating having an output curve having N, N>2, equally spaced output waveguides connected thereto;

the first and second grating both having a plurality of elements forming multiple paths through each router so as to transform a particular input wavelength applied to one of the N input waveguides of the first grating into N components producing N interleaved sets of images coupled via the N interleaved sets of arrays of coupling waveguides to the input curve of the second grating and then to the output curve of the second grating; and wherein each of the N sets of arrays of coupling waveguides has a predefined phase shifts, such that all significant orders of each image set are transmitted through the second router so as to efficiently transfer said particular input wavelength to a selected one of the N output waveguides, and wherein the selected waveguide is determined by preset phase shifts produced by the sets of arrays of coupling waveguides.

17. A method of operating a waveguide grating router comprising a grating having an input curve and an output image curve, the input curve having N, N>2, equally spaced waveguides connected thereto, the output curve having a plurality of spaced reflectors arranged thereon, the method including the steps of forming multiple paths through the router so as to transform a particular input wavelength applied to one of the N waveguides into N interleaved sets of equally spaced images on the output curve corresponding to different orders of the grating router;

reflecting back through the router, with predefined phase shifts from the N interleaved sets of reflective elements on the output curve, all significant orders of each image set so as to produce a single reflection of said particular input wavelength back to a selected one of the N waveguides, and selecting one of the N waveguides using preset phase shifts produced by the of reflective elements.

* * * * *